United States Patent Office 3,179,705
Patented Apr. 20, 1965

3,179,705
SELECTIVE HYDROGENATION OF HALOOLEFINS
William P. Coker and George E. Ham, Lake Jackson, Tex., assignors to The Dow Chemical Company, Midland, Mich., a corporation of Delaware
No Drawing. Filed Dec. 27, 1961, Ser. No. 162,560
6 Claims. (Cl. 260—648)

This invention relates to a process for selectively hydrogenating haloolefins to the corresponding saturated hydrocarbon halides.

The catalytic hydrogenation of an unsaturated halide to make the corresponding saturated hydrocarbon halide presents a difficult problem in organic synthesis. Replacement of the halogen atom by hydrogen in the course of the hydrogenation is common and this dehalogenation reaction is sometimes used to make particular compounds. Metals of Group VIII of the periodic table such as nickel, palladium and platinum are known generally to be effective hydrogenation catalysts which will also catalyze the halogen replacement reaction. For example, the hydrogenation of organic halides in the presence of nickel has been used as an analytical method for the quantitative determination of halogen. Metals of the platinum family have been found to act in a similar manner. Boeseken et al., Rec. trav. chim. 35, 260 (1916), found that trichloroacrylic acid was hydrogenated to propionic acid in the presence of a platinum catalyst, the halogen replacement reaction taking place with about the same speed as the hydrogenation of the olefinic double bond. Palladium catalysts have been used in the same way. Rosenmund et al. J. Chem. Soc. 114, 339, found that ethylenic halides could be dehalogenated by hydrogenation in the presence of palladium without saturation of the double bond. Rucker et al., U.S. 2,863,917, found that all the metals of the palladium and platinum triads, i.e., ruthenium, rhodium, palladium, osmium, iridium, and platinum, are effective catalysts for the hydrogenation of dichloroacetic acid to monochloroacetic acid. Therefore, a rhodium catalyst has been shown to have the same dehalogenating effect as other metals of the platinum and palladium groups in a particular reaction and the normal presumption that rhodium would behave in the same way as these related metals in similar reactions is thereby strengthened. It is entirely unexpected and surprising to find that this is not the case.

It has been found that in the hydrogenation of a haloolefin, rhodium preferentially catalyzes the hydrogenation of the olefinic double bond, leaving the substituted halogen largely unaffected, and yields the corresponding saturated hydrocarbon halide as the major product of the reaction. The term "haloolefin" is used in this specification to mean olefinically unsaturated aliphatic and cycloaliphatic bromides and chlorides. This reaction is carried out as a liquid phase hydrogenation under moderate conditions of temperature and pressure using conventional equipment and procedure.

Preferably, the reduction is allowed to proceed to the point where there is no further absorption of hydrogen. Although some unsaturated halides are subject to a degree of halogen replacement, the saturated halide products are stable under the conditions of the hydrogenation and hydrogen absorption stops when no more olefinic double bonds remain in the reaction mixture.

The hydrogenation reaction is run by contacting the haloolefin in the liquid state with hydrogen under at least atmospheric pressure in the presence of a finely divided rhodium catalyst. Hydrogen pressures of up to 10,000 lbs. per square inch or even higher than this may be used. Preferably, the hydrogenation is run under a hydrogen pressure of about 100–1000 lbs. per square inch gauge.

A liquid haloolefin may be hydrogenated in the absence of a solvent or it may be dissolved in an inert solvent. Saturated hydrocarbons are preferred solvents and suitable examples include cyclohexane, methylcyclohexane, octane, and similar materials. Saturated hydrocarbon halides, for example the product of the hydrogenation, are also suitable reaction solvents. A mixed solvent may be used.

The temperature at which the hydrogenation is carried out may be varied within relatively wide limits. The reaction temperature is preferably held between about 0° C. and about 150° C. although somewhat higher temperatures may be employed. It is to be understood that the particular combination of pressure and temperature used must be compatible with maintaining the organic portion of the reaction mixture in the liquid state.

The hydrogenation catalyst may be employed in the form of finely divided metal as rhodium black alone, but it is most effectively used as rhodium black dispersed and supported on an inert carrier such as charcoal, diatomaceous earth, alumina, or barium sulfate. A relatively dense, somewhat granular catalyst support is preferred for convenience in separating the catalyst from the reaction mixture. Ordinarily, such supported catalysts are made up to contain about 1–10 percent of metal based on the weight of support. The proportion of finely divided rhodium to olefinic halide is not critical so long as enough rhodium catalyst is used to catalyze the hydrogenation reaction. About 0.01 percent to 10 percent catalyst as rhodium metal may be used, based on the weight of olefinic halide being hydrogenated and about 0.1 to 1 percent is preferred.

The unsaturated halides which may be converted to the corresponding saturated hydrocarbon halides by this process include both aliphatic and cycloaliphatic unsaturated bromides and chlorides. More than one olefinic double bond and more than one halogen atom may be present in the molecule. Compounds representative of the classes meant include allyl bromide, allyl chloride, 1,3-dichloropropene, 1-chloropropene, 5-chloro-1-hexene, 1-bromo-4-chloro-2-butene, 4-(chloromethyl)cyclohexene, (2 - chloroethyl)cyclohexane, 4 - bromocyclohexene, 3-chloro-1,4-cyclohexadiene, (chloromethyl)cyclopentene, 1-chloro-1,3-butadiene, and similar haloolefins.

The process may be carried out in a closed pressure-resistant vessel or autoclave of design conventional for this type of reaction under reaction conditions as specified above. The progress of the reaction can be followed readily by observing the fall of hydrogen pressure as the hydrogenation proceeds. Upon completion of the reduction, as indicated by the cessation of hydrogen pressure drop, the catalyst is preferably separated from the reaction mixture, ordinarily by filtering, and the reduced halide product is recovered by usual means, as by distillation.

The following examples illustrate some ways in which the invention has been used, but are not to be construed as limiting the scope of the invention.

*Example 1*

A 1.41 liter stainless steel rocking autoclave was charged with 30.0 g. of 1-chloropropene, 150 g. of cyclohexane, and 2.4 g. of 5 percent rhodium on alumina. The autoclave was closed, flushed with nitrogen, and heated to 105° C., at which temperature it was pressured with hydrogen to 610 lbs. per square inch gauge. After the autoclave had been rocked for ten minutes at this temperature, the gauge pressure had dropped to 440 lbs./sq. in. Continued agitation caused no further pressure drop. The reactor was then cooled, the pressure was released by venting, and the filtered reaction mixture was distilled to obtain 13.0 g. of propyl chloride.

Example 2

By the same procedure as described in Example 1, 30.0 g. of allyl chloride was hydrogenated. The hydrogenation was complete after three minutes. A yield of 17.6 g. of propyl chloride was obtained.

Example 3

By the procedure of Example 1, 0.334 g. mole of 1,3-dichloropropene was hydrogenated. Absorption of hydrogen was complete in 30 minutes. There was obtained from the reaction mixture 0.160 g. mole of 1,3-dichloropropane.

Example 4

A 110 ml. stainless steel rocking autoclave was loaded with 5.14 g. of 5-chloro-1-hexene, 15.4 g. of cyclohexane, and 0.50 g. of 5 percent rhodium on alumina. The reactor vessel and contents were heated to 52° C. and the reactor was pressured with hydrogen to a gauge pressure of 500 lbs./sq. in. After three minutes, hydrogen absorption had ceased. Filtration and distillation of the reaction mixture yielded 5.05 g. of 2-chlorohexane.

Example 5

In the manner shown in Example 1, 22.0 g. of 4-(chloromethyl)cyclohexene was hydrogenated in the presence of 2.4 g. of 5 percent rhodium on alumina. After hydrogenation was complete, 8.06 g. of (chloromethyl)cyclohexane, B.P. 71–6° C./35 mm., $n_D^{25}$ 1.4610, was obtained from the reaction mixture.

Example 6

The reactor of Example 1 was charged with a solution of 44.4 g. of 1,3-dichloropropene in 184.9 g. of 1,3-dichloropropane and 2.4 g. of 5 percent rhodium on alumina. The reactor was closed and heated to 107° C. at which temperature it was pressured to 1140 lbs. per sq. in. gauge with hydrogen. Hydrogen absorption began immediately and was complete after about 15 minutes as evidenced by no further drop in pressure. The reactor was cooled, vented, and the contents were worked up as before. A yield of 10.0 g. of 1,3-dichloropropane was obtained, assuming no loss of that originally present as reaction solvent.

By procedures similar to those shown in the above examples, other haloolefins may be reduced to the corresponding saturated halides. Thus, allyl bromide is converted to propyl bromide. 1-bromo-4-chloro-2-butene is hydrogenated to 1-bromo-4-chlorobutane, (2-chloroethyl)cyclohexene is hydrogenated to (2-chloroethyl)cyclohexane, 4-bromocyclohexene is hydrogenated to cyclohexyl bromide and (chloromethyl)cyclopentene is hydrogenated to (chloromethyl)cyclopentane. The application of this process to other similar reductions will be apparent to the chemist.

We claim:

1. A process for hydrogenating a haloolefin of at least three carbon atoms wherein the halogen has an atomic number of 17–35 to the corresponding saturated hydrocarbon halide which comprises contacting said haloolefin in the liquid state with hydrogen in the presence of a rhodium hydrogenation catalyst.

2. The process of claim 1 wherein the rhodium catalyst is dispersed on an inert support.

3. The process of claim 1 wherein the hydrogenation is run under superatmospheric pressure.

4. The process of claim 1 wherein the hydrogenation is run at a temperature of about 0° C. to about 150° C.

5. The process of claim 1 wherein the haloolefin is dissolved in a saturated hydrocarbon solvent.

6. A process for hydrogenating a chloroolefin of at least three carbon atoms to the corresponding saturated hydrocarbon chloride which comprises contacting said chloroolefin in the liquid state with hydrogen under superatmospheric pressure in the presence of a rhodium hydrogenation catalyst at a temperature of about 0° C. to about 150° C.

References Cited by the Examiner

UNITED STATES PATENTS

| | | | |
|---|---|---|---|
| 2,118,662 | 5/38 | Baumann et al. | 260—658 |
| 3,025,329 | 3/62 | Gleason | 260—648 |

OTHER REFERENCES

Sheridan et al.: J. Chem. Soc. (London), 1952, pp. 2962–6.

LEON ZITVER, *Primary Examiner.*